United States Patent [19]

Hiraoka et al.

[11] Patent Number: 5,066,768

[45] Date of Patent: Nov. 19, 1991

[54] PREPARATION METHOD OF SPHERICAL MELAMINE RESIN PARTICULATES HAVING CROSSLINKED STRUCTURE

[75] Inventors: Saburo Hiraoka, Kasugai; Kenji Niikawa, Nagoya, both of Japan

[73] Assignee: Mitsubishi Rayon Co., Ltd., Tokyo, Japan

[21] Appl. No.: 540,793

[22] Filed: Jun. 20, 1990

[30] Foreign Application Priority Data

Jun. 23, 1989 [JP] Japan .................................. 1-159456

[51] Int. Cl.$^5$ ............................................. C08G 16/04
[52] U.S. Cl. .................................... 528/230; 528/232; 528/242; 528/243; 528/254; 528/487; 528/490; 528/491; 528/503
[58] Field of Search ............... 528/230, 232, 242, 243, 528/254, 487, 490, 491, 503

[56] References Cited

U.S. PATENT DOCUMENTS

| | | | |
|---|---|---|---|
| 2,926,079 | 2/1960 | Smith | 71/64.02 |
| 3,705,019 | 12/1972 | Mesiah et al. | 23/313 R |
| 4,083,712 | 4/1978 | Corte et al. | 71/28 |
| 4,387,212 | 6/1983 | Hummerich et al. | 528/232 |
| 4,421,545 | 12/1983 | Crews | 71/30 |
| 4,560,400 | 12/1985 | Allan et al. | 71/29 |

*Primary Examiner*—John Kight, III
*Assistant Examiner*—S. A. Acquah
*Attorney, Agent, or Firm*—Cushman, Darby & Cushman

[57] ABSTRACT

According to the present invention, spherical melamine resin particulates having a uniform particle size and crosslinked structure can be prepared by adding an acid catalyst to an aqueous solution containing at least 0.5 to less than 5% by weight of a melamine derivative which is polymerizable in the acid region, to adjust the pH of the aqueous solution to at least 4 to less than 5, and carrying out heat-treatment of the aqueous solution.

The spherical melamine resin particulates thus obtained are useful as additives for coating compositions, pigments and other materials.

6 Claims, No Drawings

5,066,768

PREPARATION METHOD OF SPHERICAL MELAMINE RESIN PARTICULATES HAVING CROSSLINKED STRUCTURE

BACKGROUND OF THE INVENTION a) Field of the Invention

The present invention relates to a method for the preparation of spherical melamine resin particulates having crosslinked structure, being excellent in resistance to heat, abrasion and solvent, and consisting of uniform spheres having a particle size of 10 μm or less.

b) Description of the Related Art

A method for mechanically crushing crosslinked melamine resin has been known as a general method for the production of melamine resin particulates. However, the particulates obtained by such method are irregular shaped and has a broad particle size distribution. Consequently, in the case of using as an organic pigment or a filler, the particulates have a disadvantage of causing various problems and development of spherical and crosslinked melamine resin particulates having a narrow particle size distribution has been strongly desired.

Another prior art for preparing the spherical and crosslinked melamine resin particulates has been proposed in Japanese Patent Publication 32-5743 (1957). An acid catalyst such as ammonium chloride is added to an aqueous solution containing methylolmelamine and the condensation and crosslinking reaction of melamine resin is progressed by maintaining said aqueous solution at a temperature of 65° to 75° C. and pH of 5 to 7. A large amount of water is rapidly added to said reaction system at the moment when a transparent aqueous solution becomes turbid, and successively allowed to stand to form the spherical melamine resin particulates.

In the method, the particulate forming reaction is forced to stop in the course of the reaction. Hence, the method causes a problem that the particulate size is remarkably dependent upon the addition time of diluting water to the reaction mixture and the pH of the reaction mixture. Narrow control range of pH and temperature is inevitable for the crosslinking and particulate forming of the melamine resin and strict control is also required for the addition time of diluting water to the reaction mixture. Hence the method is quite unsatisfactory as a technique for performing continuous production with constant quality of products in industry.

Japanese Patent Publication 43-29159 (1968) discloses a method for preparing melamine resin particulates by reacting an aqueous solution containing melamine and formaldehyde or an aqueous solution containing a precondensate of melamine and formaldehyde in the presence of protective colloid at pH 6.0 to 8.0 until solid phase is formed. In the next step, the resin particulates obtained is further divided into a fraction having an average particle size of 1 μm or less.

The method also requires to control the pH of the reaction system in a narrow range. Additionally, a hydrophilic high-molecular weight protective colloid used for the reaction leads to secondary aggregation of particulates formed in the reaction system. Thus the particulates obtained requires pulverization treatment, which is a problem of the method.

Japanese Patent Laid-Open Publication 50-45852 (1975) describes a method for the preparation of cured resin particulates. To 1 mole of a mixture composed of 100 to 50 parts by weight of benzoguanamine and 0 to 50 parts by weight of melamine, 1.2 to 3.5 moles of formaldehyde is added. The pH of the resulting aqueous solution is adjusted in the range of 5 to 10, thereby a soluble resin having a methanol miscibility of 0 to 150% is obtained. The reaction mixture is then poured with stirring into an aqueous solution of protective colloid to give an emulsion of a soluble and fusible resin. A curing catalyst is added to the emulsion and the resulting mixture is maintained in the temperature of 40° to 60° C. for at least an hour and successively cured in the temperature range of 60° to 200° C. under atmospheric or increased pressure. The cured resin thus obtained is separated, washed, dried and subjected to deaggregation treatment.

The method involves various problems. For example, a large amount of expensive benzoguanamine is used in combination with melamine and hence leads to a high cost of the product. Complex procedures are also required for the production of resin particulates. Further, the hydrophilic high molecular weight compound which is used as a protective colloid in the production step of the resin leads to secondary aggregation of the particulates in the curing and particulate forming reaction of melamine and requires grinding treatment of the resin particulates obtained.

Japanese Patent Laid-Open Publication 62-10126 (1987) proposes a method for the preparation of spherical and cured melamine resin particulates. The particulates are prepared by reacting melamine with aldehyde compounds in an aqueous medium in the presence of a basic catalyst and inorganic salts which are insoluble in water. The particulates are partly or wholly covered with substantially water-insoluble inorganic salts and have a particle size of 500 μm or less.

However, the spherical and cured melamine resin particulates of the method are obtained by covering the particulate surface with water-insoluble inorganic salts and provided with water resistance and hardness by the effect of inorganic salts. Consequently, the particulates obtained by the method have disadvantage that the resistance to abrasion and solvents is inferior to those of crosslinked melamine resin particulates.

SUMMARY OF THE INVENTION

The object of the present invention is to provide a relatively simple method for the preparation of spherical and cured melamine resin particulates having crosslinked structure, being excellent in resistance to heat, abrasion and solvent, and having a particle size of 10 μm or less.

The above object of the invention can be achieved by a preparation method of spherical melamine resin particulates having crosslinked structure comprising the steps of adding an acid catalyst to an aqueous solution containing at least 0.5 to less than 5% by weight of a melamine derivative which is polymerizable in the acid region, to adjust the pH of the aqueous solution to at least 4 to less than 5, and carrying out heat-treatment of the solution to complete particulate forming reaction of the melamine derivative.

DETAILED DESCRIPTION OF THE INVENTION

The melamine derivative of the present invention which is polymerizable in the acid region is any kind of the derivative which is soluble in water and can polymerize to form cured melamine resin by heat-treatment of the acid aqueous solution. Exemplary melamine derivatives which can be used in the invention include those having the following formula (I):

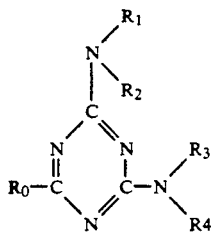

wherein $R_0$ is —H, —OH, —$C_6H_5$, —$C_nH_{2n+1}$ wherein n is an integer of 1 to 10, —$COOC_nH_{2n+1}$ wherein n is an integer of 1 to 20, —$CONR_5R_6$ or —$NR_5R_6$; and $R_1$ to $R_6$ are individually —H, —OH, —$OC_nH_{2n+1}$ wherein n is an integer of 1 to 20, —$CH_2OC_nH_{2n+1}$ wherein n is an integer of 1 to 20, —$CH_2COOC_nH_{2n+1}$ wherein n is an integer of 1 to 20, —$CH_2OH$, —$CH_2C$-$H_2OH$, —$CONH_2$, —$CONHCH_2OH$, —$CH_2NH$-$COC_nH_{2n+1}$ wherein n is an integer of 1 to 20, or —O-$(OX)_nR_7$ wherein n is an integer of 1 to 1500, $R_7$ is —H, —$CH_3$, —$C_2H_5$ or —$C_3H_7$, and X is —$C_2H_4$—, —$C_3H_6$— or —$C_4H_8$—.

Preferred melamine derivatives have the above formula (I) wherein $R_0$ is $NR_5R_6$; $R_1$ to $R_6$ are individually —H, —$CH_2OC_nH_{2n+1}$ wherein n is an integer of 1 to 20, or —$CH_2OH$; and at least one of $R_1$ to $R_6$ is —$CH_2OC_nH_{2n+1}$ wherein n is an integer of 1 to 20.

In the above melamine derivatives, methylolmelamine is more preferred for the present invention. Methyl ether derivatives of methylolmelamine are most preferred in view of the solubility in water and reactivity.

It is an important requirement of the present invention that the concentration of the melamine derivative in the aqueous solution is restricted to at least 0.5 to less than 5% by weight.

When the concentration of the melamine derivative is less than 0.5% by weight, formed melamine resin particulates have remarkably small particle size and it becomes unfavorably difficult after completing the reaction to fractionate and collect the particulates from the aqueous solution.

When the concentration of the melamine derivative is 5% by weight or more in the aqueous solution, it is difficult to obtain spherical melamine particulates from the reaction system. Even if the spherical melamine resin can be obtained, the melamine resin becomes undesirably coarse particles.

The acid catalyst used for the practice of the present invention includes, for example, inorganic acids such as sulfuric acid, hydrochloric acid, nitric acid and phosphoric acid; and organic acids such as formic acid, oxalic acid and acetic acid.

Sulfuric acid is particularly preferred in these acid catalysts for use in the invention. The acid catalyst is used for adjusting the pH of the aqueous solution containing the melamine derivative to at least 4 to less than 5. Consequently, salts such as common inorganic salts and organic salts are unsuitable for the catalyst.

The aqueous solution containing the melamine derivative having a pH value of 5 or more is unfavorable for use because non-spherical melamine resin particulates are formed.

When the aqueous solution containing the melamine derivative having a pH value of less than 4 is used, the melamine resin particulates formed have an extraordinarily small particle size and, additionally, it becomes unfavorably difficult to fractionate and collect the particulates from the reaction mixture.

The pH adjusted aqueous acid solution of the melamine derivative is heat-treated at temperature of preferably from 60° to 140° C., more preferably from 70° to 100° C. The temperature less than 60° C. leads to slow polymerization rate of the melamine derivative in the reaction system. When the temperature exceeds 140° C., control of the reaction system becomes unfavorably difficult. Heat-treatment time is determined depending upon the heat-treatment temperature. It is necessary to carry out the heat-treatment for sufficient time until particle forming reaction of the melamine derivative is completed.

The treatment time is usually in the range of several minutes to several dozens of minutes.

Heat-treatment of the melamine derivative for a time enough to complete the particle forming reaction leads to an important characteristic of the present invention, in other words, the spherical melamine resin particulates having a crosslinked structure and consisting of uniform particles having a particle size of 10 μm or less can be obtained even though the heat-treatment temperature and time are varied to a certain extent.

After completing the reaction by the heat-treatment, the spherical and crosslinked melamine resin particulates are filtered from the reaction mixture, washed with water and dried. Washing and drying can be carried out by using a conventionally known method for washing and drying particulates.

It is thought that the spherical melamine resin particulates having a uniform particle size can be obtained by the following reason in the present invention.

Since the concentration of the melamine derivative in the aqueous medium is set at least 0.5 to less than 5% by weight, intermolecular distance of the dispersed melamine derivative is increased in the aqueous solution and merely the melamine derivative located very close to each other contributes to the formation of particles. Thus the spherical melamine resin particulates having relatively small particle size can be obtained.

Formation rate of spherically cured melamine resin particulates is suitably controlled by adjusting the pH of the reaction system with the acid catalyst to at least 4 to less than 5 and by carrying out the heat-treatment of the reaction system. As a result, it is assumed that the spherical melamine resin particulates having a uniform particle size of 10 μm or less can be obtained without mutual aggregation of the spherical melamine resin particulates formed and resulting generation of irregularly shaped particles.

According to the present invention, the crosslinked and spherically cured melamine resin particulates can be efficiently produced. The particulates obtained has a narrow particle size distribution and can be used as an additive for coating compounds, pigments and other materials.

The present invention will hereinafter be illustrated further in detail by way of examples.

EXAMPLE 1

Methyl ether derivative of trimethylolmelamine (Trade Mark; Beckamine PMN, a product of Dainippon Ink And Chemicals Inc.) was dissolved in water in a concentration of 0.2 to 8% by weight as illustrated in Table 1. To each solution, sulfuric acid was added at 25° C. so as to obtain a concentration of 0.02% by weight, respectively. The mixture obtained was heated to 98° C. at a rate of 2.5° C./min. and successively heat-treated at 98° C. for 30 minutes. Then the reaction mixture was cooled to obtain a milky aqueous solution containing spherical melamine resin particulates which were cured by crosslinking.

In order to collect the spherical melamine resin particulates from the aqueous solution thus obtained, the milky aqueous solution was filtered with a Buchner funnel through a filter paper (Trade Mark; Advantec No. 5C, a product of Toyo Filter Paper Co., Ltd.). The filtered material was successively washed with water to obtain water containing spherical melamine resin particulates. Then the particulates were dried at 120° C. for 30 minutes in a hot air drying oven to obtain white spherical melamine resin particulates.

In order to examine the shape of the spherical melamine resin particulates, the particulates were observed under a scanning electron microscope. Results are illustrated in Table 1.

TABLE 1

| Experiment | Composition | | | Particulates | |
|---|---|---|---|---|---|
| | Backamine PMN (wt. %) | Sulfuric acid (wt. %) | pH | Shape | Particle size ($\mu$m) |
| Example | 1 | 0.02 | 4.3 | sphere | 1.5 |
| | 2 | 0.02 | 4.5 | sphere | 2.6 |
| | 3 | 0.02 | 4.8 | sphere | 4.3 |
| Comparative Example | 0.2 | 0.02 | 4.2 | cannot be filtered | |
| | 8 | 0.02 | 4.9 | sphere and amorphous | 1 ~ several dozens |

The above results illustrate that uniform and spherical melamine resin particulates could be obtained by treating trimethylolmelamine under conditions of the present invention.

As illustrated in comparative examples, when the concentration of the aqueous trimethylolmelamine solution was lower than the concentration under treatment conditions of the invention, the particle size was too small and the particulates formed could not be filtered. On the other hand, when the concentration of the trimethylolmelamine solution was higher than that under treatment conditions of the invention, amorphous particulates were mixed in the spherical particulates and the particle size became non-uniform, namely, amorphous.

EXAMPLE 2

To the aqueous solution containing 2% by weight of Beckamine PMN which was used in Example 1, 0.04% by weight of oxalic acid was added and mixed. The aqueous solution obtained had pH of 4.6. The solution was heated from 25° C. to 98° C. at a rate of 2.5° C./min and successively heat-treated at 98° C. for 30 minutes. A milky aqueous solution containing spherical melamine resin particulates thus obtained was treated by the same procedures as conducted in Example 1. White spherical melamine resin particulates were obtained.

The particulates were observed under a scanning electron microscope and found that the particles had a size of 2.6 $\mu$m and consisted of almost uniform and spherical particulates.

As a comparative example, the above aqueous trimethylolmelamine solution was warmed from 25° to 40° C. at a rate of 2.5° C./min and successively treated at 40° C. until milky solution having almost equal turbidity to that of the above treatment at 98° C. was obtained. It took about 5 hours. The milky solution was treated by the same procedures as conducted in Example 1 to obtain white spherical melamine particulates. The particulates were observed under a scanning electron microscope. The particle size of the melamine particulates varied considerably and was in the range of 0.2 to 5.7 $\mu$m.

EXAMPLE 3

To an aqueous solution containing 3% by weight of Beckamine PMN used in Example 1, 0.02% by weight of sulfuric acid was added and mixed. The mixture obtained had pH of 4.6 and was heated from 25° to 80° C. at a rate of 2.5° C./min. The mixture was successively heat-treated at 80° C. for 30 minutes to obtain a milky aqueous solution containing spherical melamine resin particulates. The milky solution was treated by the same procedures as conducted in Example 1 to obtain white spherical melamine resin particulates.

In order to examine shape of the spherical melamine resine particulates, the particulates were observed under a scanning electron microscope. The particulates were uniform and had a particle size of 3.2 $\mu$m.

As a comparative example, the above aqueous solution of beckamine PMN was prepared and raised its temperature to 80° C. at a rate of 2.5° C./min. At the moment when the transparent solution reached to milky solution, a large amount of water was rapidly added and the resulting mixture was allowed to stand. Thus, a milky aqueous solution containing spherical melamine resin particulates was obtained.

In order to examine the shape of the spherical melamine resin particulates, the resin was observed under a scanning electron microscope and found that the particle size had a variation of 0.3 to 3 $\mu$m and amorphous particulates were mixed.

As another comparative example, an aqueous solution containing 8% by weight of the same trimethylolmelamine as above was prepared and 0.04% by weight of sulfuric acid was added. The mixture obtained had pH of 4.6. The mixture was heated to 80° C. at a rate of 2.5° C./min. At the moment when the transparent solution reached to milky solution, a large amount of water was rapidly added and the resulting mixture was allowed to stand. Thus, a milky aqueous solution containing spherical melamine resin particulates was obtained.

In order to examine the shape of the spherical melamine resin particulates, the resin was observed under a scanning electron microscope and found that the particle size had a variation of 0.2 to several hundred $\mu$m and amorphous particulates were mixed.

EXAMPLE 4

To an aqueous solution containing 2% by weight of Beckamine PMN used in Example 1, oxalic acid was added to adjust the pH of the system a illustrated in Table 2. The mixture obtained was heated from 25° C. to 98° C. at a rate of 2.5° C./min and successively heat-treated at 98° C. for 30 minutes. Then the reaction mixture was cooled to obtain a milky aqueous solution containing spherical melamine. The aqueous solution was treated by the same procedures as conducted in Example 1 to obtain white spherical melamine resin particulates.

In order to examine the shape of the spherical melamine resin particulates, the particulates were observed under a scanning electron microscope. Results are illustrated in Table 2.

TABLE 2

| Experiment | Composition | | | Particulates | |
|---|---|---|---|---|---|
| | Backamine PMN (wt. %) | Sulfuric acid (wt. %) | pH | Shape | Particle size (μm) |
| Example | 2 | 0.02 | 4.9 | sphere | 2.5 |
| | 2 | 0.06 | 4.3 | sphere | 2.6 |
| Comparative Example | 2 | 0.002 | 6.1 | sphere and amorphous | 1 ~ several hundred |
| | 2 | 0.4 | 3.1 | cannot be filtered | |

The above results illustrate that spherical melamine resin particulates could be obtained by treating trimethylolmelamine under conditions of the present invention.

As illustrated in comparative examples, when the trimethylolmelamine solution was treated at higher pH than that under the treatment conditions of the invention, amorphous particulates were mixed in the spherical particulates and the particle size became nonuniform. When the trimethylolmelamine solution was treated at lower pH than that under the treatment conditions of the invention, the particulates obtained were too small and could not be filtered.

EXAMPLE 5

To an aqueous solution containing 2% by weight of methyl ether derivative of hexamethylolmelamine (Trade Mark; Sumitex Resin M-6, a product of Sumitomo Chemical Co., Ltd.), 0.003% by weight of sulfuric acid was added to adjust the pH of the resulting aqueous solution to 4.3. The solution was heated from 25° C. to 98° at a rate of 2.5° C./min, and successively heat-treated at 98° C. for 30 minutes and cooled. Thus a milky aqueous solution containing spherical melamine resin particulates was obtained. The solution was treated by the same procedures as conducted in Example 1. White spherical melamine resin particulates were obtained.

In order to examine the shape of the spherical melamine resin particulates, the particulates were observed under a scanning electron microscope. The particulates had a particle size of 3 μm and consisted of almost uniform particles.

What is claimed is:

1. A preparation method of spherical melamine resin particulates having crosslinked structure comprising the steps of adding an acid catalyst to an aqueous solution containing at least 0.5 to less than 5% by weight of a melamine derivative which is polymerizable in the acid region, to adjust the pH of said aqueous solution to at least 4 to less than 5, and carrying out heat-treatment of the solution to complete particulate forming reaction of the melamine derivative.

2. The preparation method of claim 1 wherein the heat-treatment temperature is in the range of from 60° C. to 140° C.

3. The preparation method of claim 1 wherein the melamine derivative is represented by the formula (I):

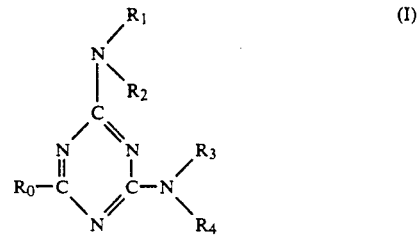

wherein $R_0$ is —H, —OH, —C$_6$H$_5$, —C$_n$H$_{2n+1}$ wherein n is an integer of 1 to 10, —COOC$_n$H$_{2n+1}$ wherein n is an integer of 1 to 20, —CONR$_5$R$_6$ or —NR$_5$R$_6$; and $R_1$ to $R_6$ are individually —H, —OH, —OC$_n$H$_{2n+1}$ wherein n is an integer of 1 to 20, —CH$_2$OC$_n$H$_{2n+1}$ wherein n is an integer of 1 to 20, —CH$_2$COOC$_n$H$_{2n+1}$ wherein n is an integer of 1 to 20, —CH$_2$OH, —CH$_2$C-H$_2$OH, —CONH$_2$, —CONHCH$_2$OH, —CH$_2$NH-COC$_n$H$_{2n+1}$ wherein n is an integer of 1 to 20, or —O-(OX)$_n$R$_7$ wherein n is an integer of 1 to 1500, $R_7$ is —H, —CH$_3$, —C$_2$H$_5$ or —C$_3$H$_7$, and X is —C$_2$H$_4$—, —C$_3$H$_6$, or —C$_4$H$_8$—.

4. The preparation method of claim 1 wherein the melamine derivative is methylolmelamine represented by the formula (I) wherein $R_0$ is —NR$_5$R$_6$; $R_1$ to $R_6$ are individually —H, —CH$_2$OC$_n$H$_{2n+1}$ wherein n is an integer of 1 to 20, or —CH$_2$OH; and at least one of $R_1$ to $R_6$ is —CH$_2$OC$_n$H$_{2n+1}$ wherein n is an integer of 1 to 20.

5. The preparation method of claim 1 wherein the acid catalyst is one or more of inorganic acid selected from the group consisting of sulfuric acid, hydrochloric acid, nitric acid and phosphoric acid, or one or more of organic acid selected from the group consisting of formic acid, oxalic acid and acetic acid.

6. The preparation method of claim 1 wherein the acid catalyst is sulfuric acid.

* * * * *